United States Patent
Vrame et al.

(10) Patent No.: US 7,699,283 B2
(45) Date of Patent: Apr. 20, 2010

(54) SUPPORT BRACKET FOR ELECTRICAL BOX

(75) Inventors: Peter A. Vrame, Elk Grove Village, IL (US); Paul A. Vrame, Crystal Lake, IL (US)

(73) Assignee: S-P Products, Inc., Elk Grove Village, IL (US)

( * ) Notice: Subject to any disclaimer, the term of this patent is extended or adjusted under 35 U.S.C. 154(b) by 0 days.

(21) Appl. No.: 12/006,563

(22) Filed: Jan. 3, 2008

(65) Prior Publication Data

US 2009/0173865 A1 Jul. 9, 2009

(51) Int. Cl.
*A47H 1/10* (2006.01)
(52) U.S. Cl. .................. 248/317; 220/309; 248/343; 248/906
(58) Field of Classification Search .......... 248/343, 248/68.1, 142, 344, 909, 906; 220/3.2, 3.3, 220/3.9, 3.92, 3.94; 174/58
See application file for complete search history.

(56) References Cited

U.S. PATENT DOCUMENTS

| | | | |
|---|---|---|---|
| 5,354,952 A | 10/1994 | Hickey | |
| 5,810,303 A * | 9/1998 | Bourassa et al. | 248/205.1 |
| 5,971,329 A | 10/1999 | Hickey | |
| D449,218 S | 10/2001 | Vrame | |
| 6,590,155 B2 | 7/2003 | Vrame et al. | |
| 2003/0029983 A1 * | 2/2003 | Pfaller | 248/343 |
| 2005/0045793 A1 * | 3/2005 | Johnson et al. | 248/343 |
| 2005/0067546 A1 * | 3/2005 | Dinh | 248/343 |
| 2007/0057130 A1 * | 3/2007 | Nikayin et al. | 248/216.1 |

* cited by examiner

*Primary Examiner*—Ramon O Ramirez
(74) *Attorney, Agent, or Firm*—Wood, Phillips, Katz, Clark & Mortimer

(57) ABSTRACT

A unitary support bracket facilitates secure and efficient support of an electrical box, and one or more associated conduits. The support bracket includes a central portion, and a plurality of leg portions which extend integrally therefrom. Each of the leg portions includes a downwardly deformable distal portion, which in turn each include at least one resiliently deformable tab engageable with a respective one of the conduits. By this arrangement, the efficient support of an electrical box, and one or more associated conduits, can be provided, with minimal assembly of various components required, thus facilitating convenient and efficient installation of the associated electrical system.

7 Claims, 4 Drawing Sheets

SUPPORT BRACKET FOR ELECTRICAL BOX

The present invention relates generally to an arrangement for supporting an electrical junction box, and associated conduits, and more particularly to an improved unitary support bracket for an electrical box, which can be selectively configured to facilitate efficient and convenient assembly and support of associated conduits, including conduits extending in four different horizontal directions from the electrical box, as well as one or more conduits extending vertically therefrom.

BACKGROUND OF THE INVENTION

In the typical construction of a building structure, electrical wiring for the structure is typically routed through various conduits, with the conduits commonly joined to an electrical box, within which suitable electrical connections or the like are provided. As will be recognized by those familiar with the art, typical building codes require that such conduits and electrical boxes meet certain structural requirements, including spacing, support, and like requirements.

Heretofore, support of an electrical box, and one or more associated conduits, has typically required that a suitable arrangement of support brackets, clamps, fasteners, and the like be employed to ensure that the electrical components meet the applicable building codes. As such, installation of typical electrical boxes and conduits can be relatively time-consuming, as workers must fit and assemble the various brackets, clamps, and like components to ensure that the resultant structure is in accordance with industry standards.

The present invention is directed to an improved, unitary, one-piece support bracket for an electrical box, and one or more associated conduits, which particularly facilitates efficient installation of such components, while at the same time, permitting the arrangement to be customized, as may be required, for use with a wide variety of different configurations of an electrical box and conduit elements.

SUMMARY OF THE INVENTION

A support bracket for an electrical box embodying the principles of the present invention is desirably configured as a unitary, generally planar support plate, by which the electrical box can be efficiently suspended and supported, such as on a threaded rod, beam clamp, or like support element. Notably, the support plate includes a plurality of leg portions, each one of which is configured to securely support a plurality of conduits operatively connected to the electrical box. Notably, the leg portions of the support plate can be separated, as may be required, to thereby tailor and customize the support bracket for a wide variety of differing installations of electrical components.

In accordance with the illustrated embodiment, the present support bracket includes a unitary support plate comprising a central portion defining at least one aperture for receiving an associated vertical support element, such as a threaded rod, beam clamp, or other support, preferably so as to comply with typical building codes.

The unitary support plate further includes a plurality of leg portions extending integrally from the central portion. Each of the leg portions includes a horizontal portion extending integrally from the central portion, and a deformable distal portion extending from the respective horizontal portion. Notably, each of the distal portions defines a plurality of deformable tab elements engageable with respective ones of the conduits associated with the electrical box. Additionally, each leg portion is preferably scored at the juncture of the distal portion with the horizontal portion thereof, to thereby facilitate downward deformation of the distal portion. In this manner, the distal portion of each leg portion is downwardly deformable from the respective horizontal portion to extend downwardly therefrom generally at a right angle. Conduits which extend horizontally from the electrical box can thus be efficiently and conveniently assembled with the electrical box, and supported generally by the downwardly extending distal portion of each of the leg portions.

In the preferred form, the horizontal portion of each leg portion includes at least gusset for enhancing rigidity thereof, thereby desirably permitting the support plate to exhibit the necessary strength, while allowing manufacture from a relatively thinner gage of metal. Additionally, the horizontal portion of each leg portion preferably defines a plurality of laterally spaced openings, which correspond in spacing to the spacing of knock-out openings provided in the sides of the electrical box. Such openings can be non-threaded, to permit the insertion of self-tapping screws or the like therein, or the openings can be threaded to facilitate the provision of clamps or the like for securing the associated conduits in position.

Notably, the present support plate can be configured in two different forms, with one form including four of the leg portions, and the other form including two of the leg portions. In the first form, the for leg portions extend from the central portion, and are spaced at right angles to each other. In this embodiment, the support plate is preferably scored at the juncture of each of the leg portions with the central portion, to thereby facilitate separation of any selected one or more of the leg portions from the central portion. Thus, the support bracket can be readily customized for any particular arrangement of conduits which are fitted to the electrical box.

In the alternate form, the unitary support plate of the present bracket includes a pair of the leg portions extending in opposite directions from the central portion. In this embodiment, the support plate is scored to permit the leg portions to be separated from each other, again to facilitate customization of the support bracket for any particular installation, as may be required.

In both embodiments of the present support bracket, the central portion of the support plate preferably defines at least one opening through which an associated conduit can extend generally vertically through the support plate. Such openings are preferably spaced to correspond to "knock-out" openings typically provided in the back side (top) of electrical boxes, thereby facilitating convenient and efficient joining of conduits to the electrical box, with the conduits extending generally vertically from the box.

Other features and advantages of the present invention will become readily apparent from the following detailed description, the accompanying drawings and the appended claims.

DETAILED DESCRIPTION

Figure 1:
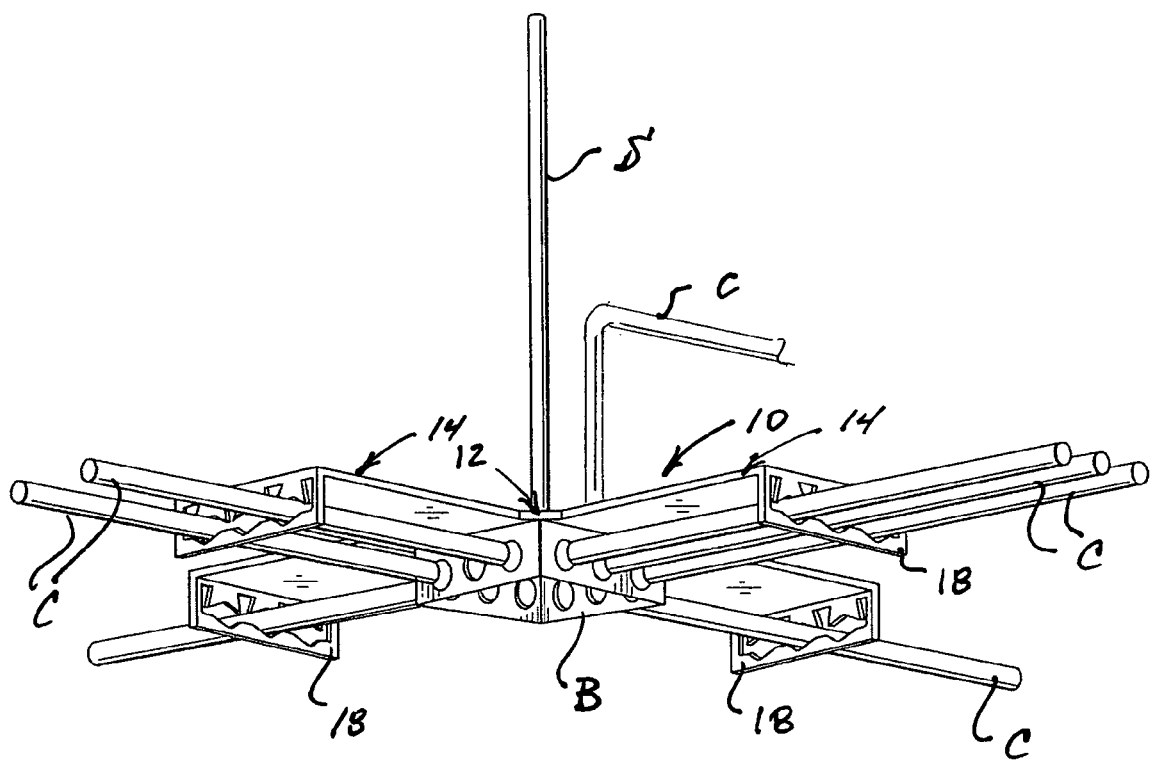
FIG. 1 is a perspective view of a support bracket for an electrical box embodying the principles of the present invention, wherein the support bracket has been configured for use with an electrical box having associated conduits extending horizontally in four different directions thereof, with an additional conduit illustrated as extending vertically from the electrical box.

While the present invention is susceptible of embodiment in various forms, there is shown in the drawings, and will hereinafter be described, presently preferred embodiments, with the understanding that the present disclosure is to be considered as an exemplification of the invention, and is not intended to limit the invention to the specific embodiments illustrated.

With reference to drawings, therein as illustrated a support bracket 10 configured for supporting an associated electrical box B, and associated conduits C operatively connected with the electrical box. As will be recognized by those familiar with the art, the typical arrangement of the electrical box and associated conduits is one in which the electrical box is supported from an associated vertical support S, with the conduits extending generally horizontally from the sides of the electrical box. Additionally, the illustrated installation includes a conduit C extending generally vertically from the electrical box B, again, as may be found in a typical installation. As will be further described, the support bracket 10 of the present invention facilitates convenient and efficient assembly of the various conduits C with the electrical box, while permitting the arrangement of the electrical box and conduits to be securely and stable supported from the vertical support S.

Figure 2:
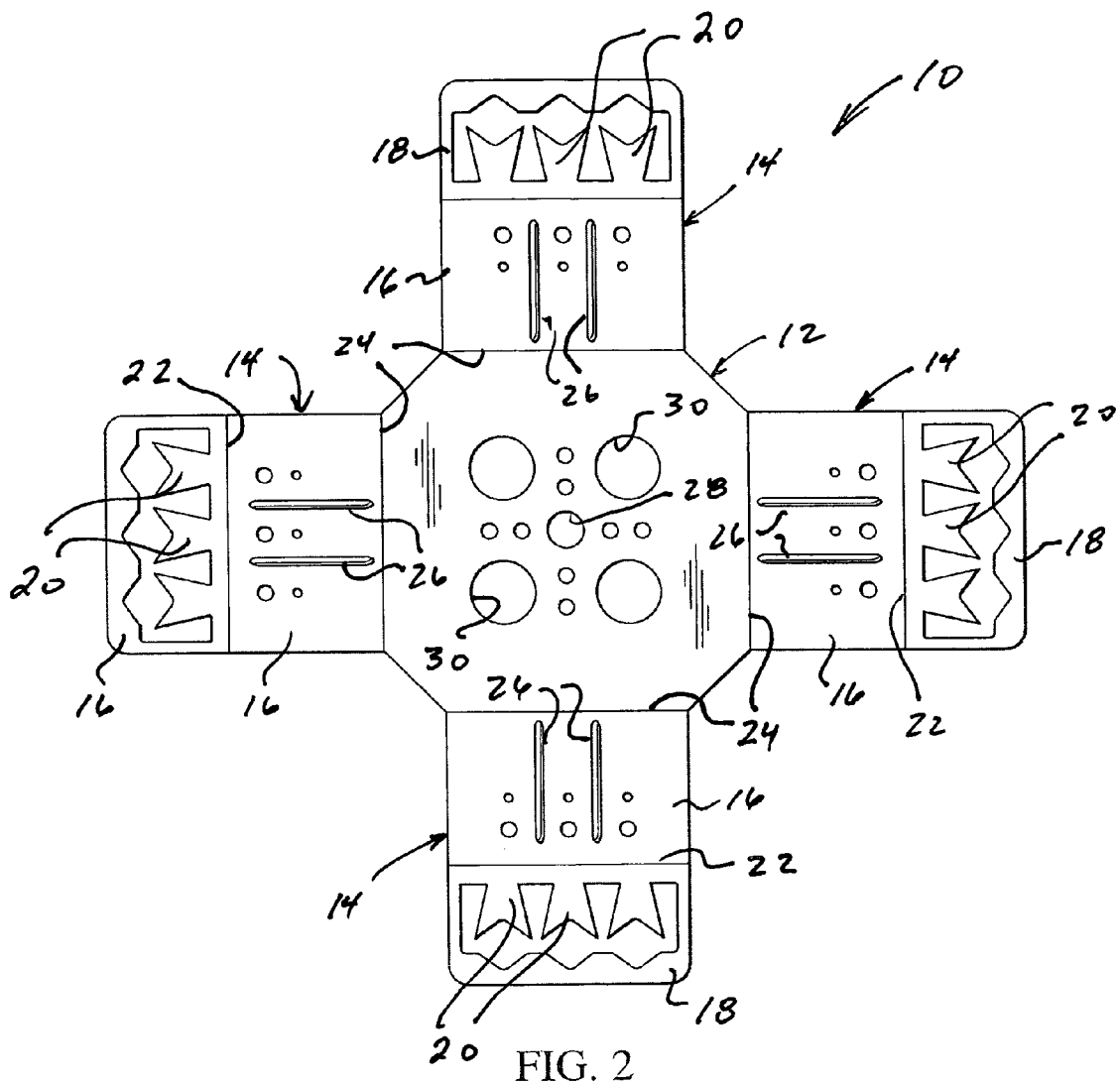
FIG. 2 is a top plan view of the support bracket of the present invention, shown prior to deformation of the bracket for installation and an assembly with an associated electrical box and conduit.
Figure 3:
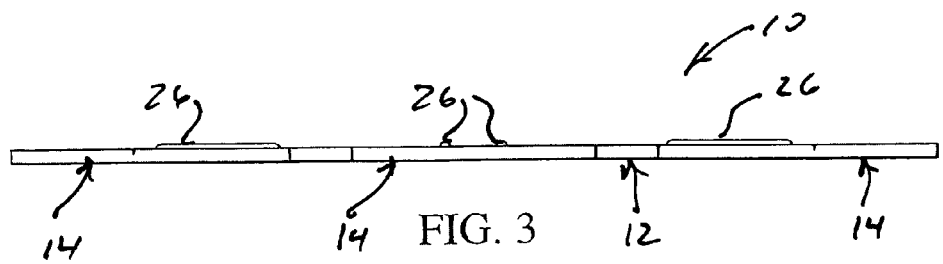
FIG. 3 is a side elevational view of the support bracket shown in FIG. 2.
Figure 4:
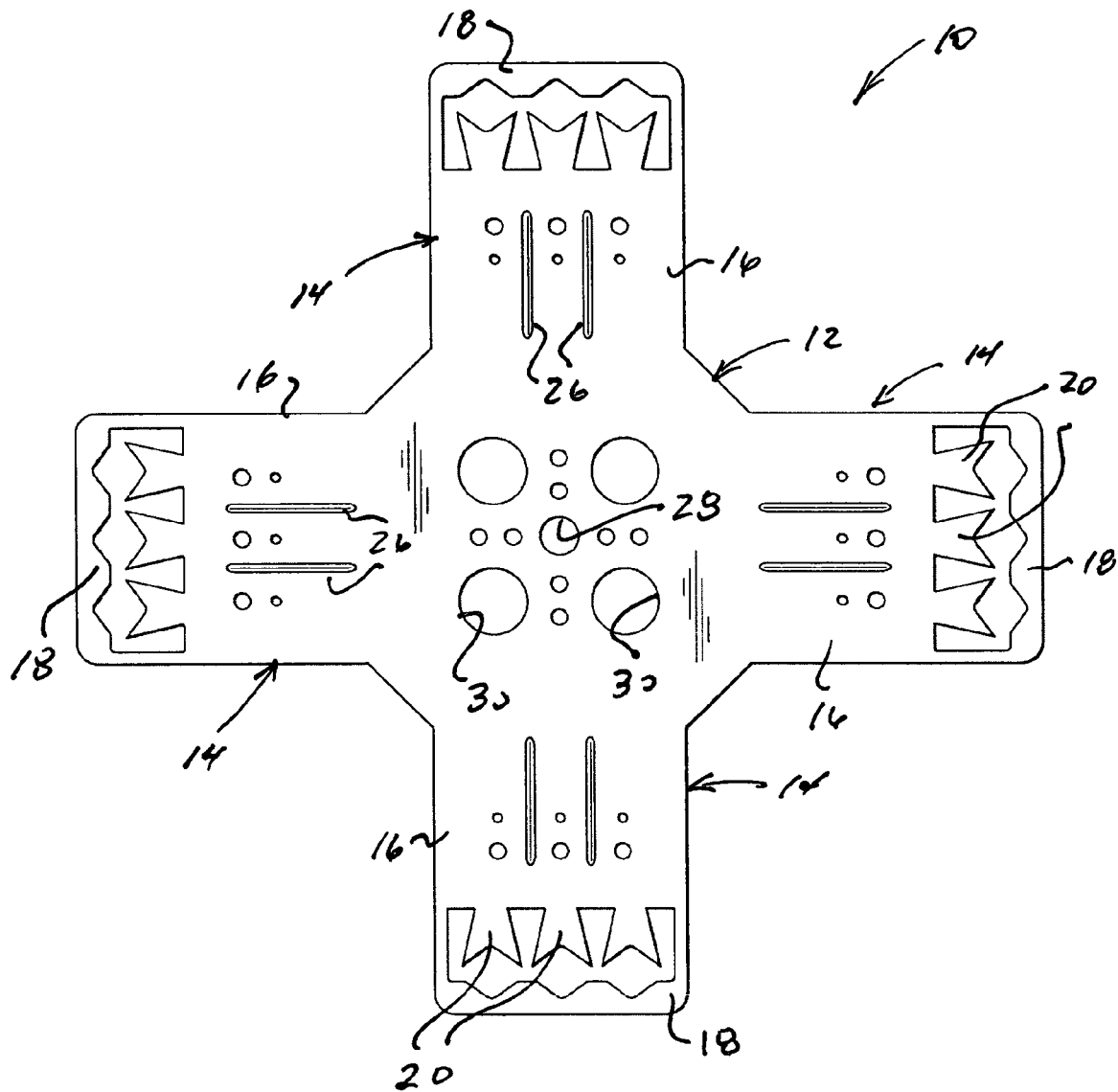
FIG. 4 is a bottom plan view of the support bracket shown in FIG. 2.

With particular reference to FIG. 2, support bracket 10 of this embodiment of the present invention is configured to facilitate routing of conduits C from electrical box B in any of one to four horizontal directions from the electrical box, as well as vertically from the electrical box. To this end, the support bracket 10 is configured as a unitary, one-piece support plate, including a central portion 12, and a plurality of leg portions 14 extending integrally from the central portion 12.

Each leg portion 14 comprises a horizontal portion 16 extending integrally from the central portion 12, and a deformable distal portion 18 extending from the respective horizontal portion 16. Each of the distal portions 18 preferably defines a plurality of deformable tab elements 20 engageable with respective ones of the conduits C, with the spacing of tab elements 20 corresponding to that of knock-out openings provided in each side of the electrical box B. Thus, one or more conduits can be fitted to extend through a respective one of the distal portions 18, by which an appropriate one of the deformable tabs 20 is engaged and resiliently deflected to hold that one of the conduits in position for support and positioning with the associated electrical box.

The support bracket 10 is preferably manufactured in the illustrated generally planar configuration, thus facilitating convenient and efficient shipment and storage. It would be appreciated that configuring the support bracket for any specific installation is facilitated by scoring or otherwise cutting the bracket to permit selective downward deformation of the distal portions 18, and/or selective removal of one or more of the leg portions 14 from the central portion 12. Thus, each leg portion is scored at 22 to facilitate downward deformation of the respective distal portion 18, with the support plate of the bracket being scored at 24 at the juncture of each of the leg portions with the central portion, to thereby facilitate separation of any selected one or more of the leg portions from the central portion.

In the preferred embodiment, each of the leg portions 14 of the support bracket 10 includes at least one gusset 26 for enhancing rigidity of the leg, thereby permitting the legs of the support bracket to exhibit the requisite strength, while permitting formation of the bracket from a relatively thinner gauge of metal, typically galvanized steel. Additionally each of the leg portions 14 of the support bracket are preferably provided with a plurality of laterally spaced openings, illustrated adjacent the gussets 26, which can be sized for receiving associated screws (typically a one-eighth inch opening), or tapped and threaded (typically one-quarter inch holes) to receive bolts to secure tabs to the conduits, or to install clamps for larger conduits on the top of the support bracket. Notably, the various openings are laterally spaced in a fashion which corresponds in spacing to the spacing of typical knock-out openings provided in the sides of the electrical box B, again, facilitating convenient and efficient assembly of the associated conduits with the electrical box.

The central portion 12 of the support bracket 10 is likewise preferably provided with a plurality of openings to facilitate efficient assembly and support of the electrical box B, and associated components. At least one aperture is provided in the central portion, such as in the form of a central aperture 28 which can be provided as a three-eighth inch hole threaded for a rod or beam clamp, or other vertical support such as S. One or more holes (such as having a one-quarter inch diameter) can be provided extending generally at right angles from the central aperture 29, which holes can be configured for receiving associated support bolts or rods.

Notably, the central portion 12 preferably defines a plurality of openings 30 positioned to conform to the spacing of typical knock-out openings provided on the back (top) of the electrical box, whereby one or more conduits can extend vertically from the electrical box, and through the central portion 12 of the support bracket 10.

Other features of the support bracket 10 will be readily appreciated. As noted, configuring the support 10 to include four of the leg portions extending from the central portion, and spaced at right angles to each other, permits the support bracket to be configured for a wide variety of differing applications. Outer edge corners of each of the leg portions 12 are preferably rounded to facilitate convenient handling of the bracket by installers. In a typical configuration, wherein the central portion 12 measures approximately six inches between oppositely extending ones of the leg portions 14, the bracket is configured to efficiently and conveniently support a typical electrical box having a four-inch by four-inch or four and eleven sixteenths by four and eleven sixteenths inch dimensions. However, a support bracket embodying the principles of the present invention can be readily configured for support of larger electrical boxes.

Figures 5, 6, 7:
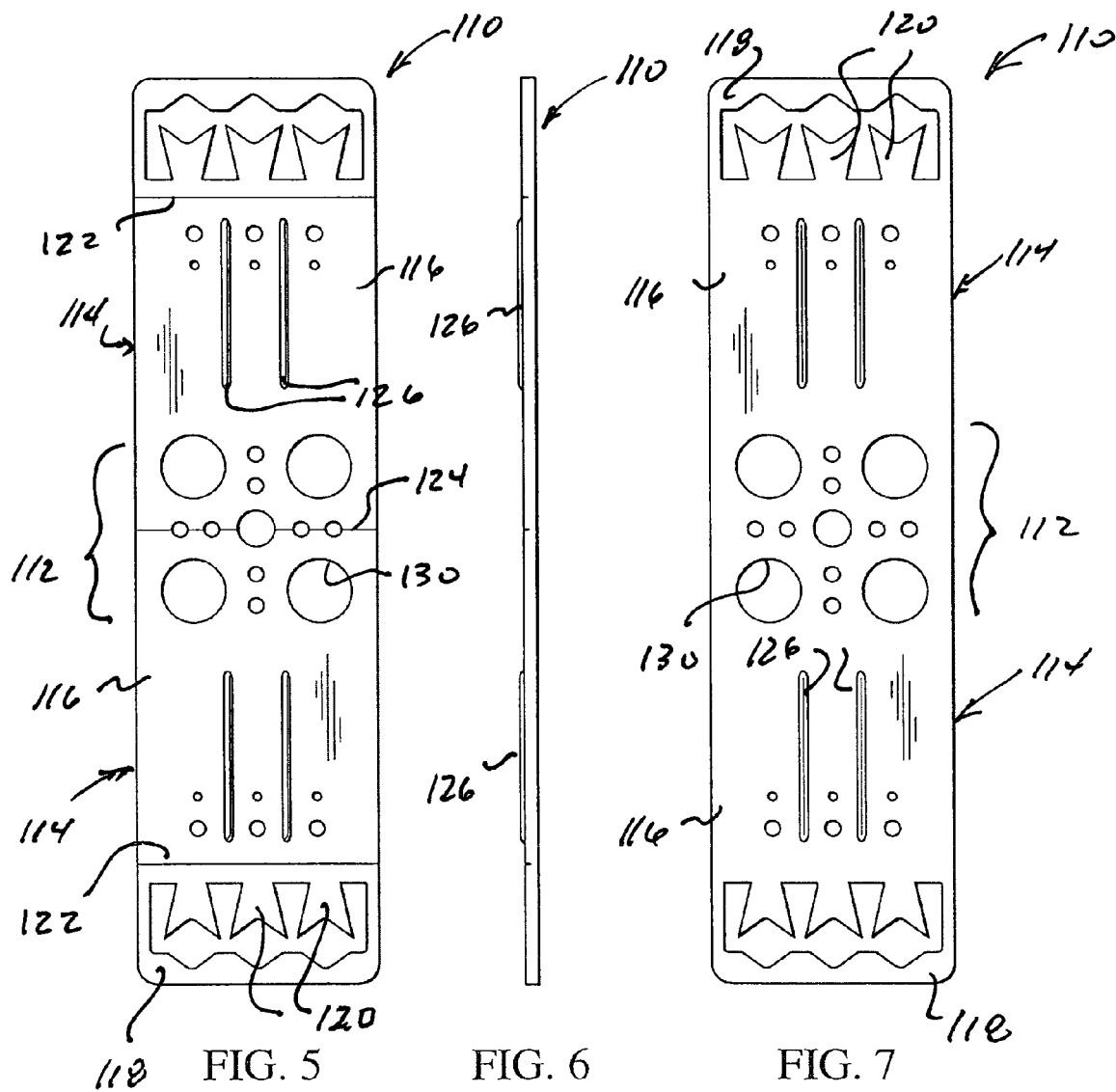
FIG. 5 is a top plan view of an alternate embodiment of the present support bracket.
FIG. 6 is a side elevational view of the support bracket shown in FIG. 5.
FIG. 7 is a bottom plan view of the support bracket shown in FIG. 5.

With reference now to FIGS. 5-7, therein as illustrated in an alternate embodiment of the present support bracket, with elements thereof which generally correspond to the previously described embodiment designated by like reference numerals in the one-hundred series.

As will be noted, support bracket 110 is configured for those applications where it may be desired to assemble and support associated conduits which extend horizontally from opposite sides of an associated electrical box, as well as vertically from the electrical box. To this end, support bracket 110 is provided in the form of a unitary, one-piece support plate, including a central portion 112, with a pair of leg portions 114 extending integrally in opposite directions from the central portion 112. Each leg portion 114 preferably includes a horizontal portion 116, and a downwardly deformable distal portion 118, having a plurality of deformable tab elements 120 engageable with respect to ones of associated conduits. Each of the leg portions 116 is preferably scored at 122 to facilitate downward deformation of the respective distal portion 118.

The rigidity of each of the leg portions 114 is desirably enhanced by the provision of at least one gusset 126 in the horizontal portion 116 of the leg portion. Each leg portion preferably defines a plurality of laterally spaced openings, shown adjacent to the gussets 126, which correspond in spacing to the spacing of knock-out openings provided in the sides of the associated electrical box, to thereby facilitate receipt of mechanical fasteners or the like for securing and support associated conduits in position.

The central portion 112 of the support bracket 110 preferably defines at least one aperture for receiving an associated vertical support element, such at central aperture 128, with the central portion 112 preferably defining at least one opening 130 through which an associated conduit can extend vertically through the support plate.

In this embodiment, the central portion of the support plate is scored, at 124, whereby leg portions 114 can be separated from each other. Thus, a portion of the support bracket can be employed in those applications where conduits may only extend horizontally in one direction from the associated electrical box, with the support still accommodating one or more conduits extending vertically through openings 130 in the bracket.

From the foregoing, we observe that numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A support assembly for an electrical box, and one or more associated conduits, comprising:
   a support bracket including unitary support plate comprising a central portion defining at least one aperture, and a plurality of leg portions extending integrally from said central portion, and
   a vertical support element, said central portion of said support bracket defining at least one aperature through which said vertical support element extends,
   each of said leg portions including a horizontal portion extending integrally from said central portion in substantially coplanar relationship therewith, and a deformable distal portion extending from the respective horizontal portion,
   each of said distal portions having an opening defining a plurality of deformable tab elements engageable with respective ones of said conduits extending through the respective opening, each said distal portion being downwardly deformable from the respective horizontal portion to extend downwardly therefrom generally at a right angle.

2. A support assembly in accordance with claim 1, wherein:
   the horizontal portion of each said leg portion includes at least one gussets for enhancing rigidity.

3. A support assembly in accordance with claim 1, wherein:
   each said leg portion is scored at the juncture of the distal portion with the horizontal portion thereof to facilitate downward deformation of the distal portion.

4. A support assembly in accordance with claim 1, wherein:
   the horizontal portion of each said leg portion defines a plurality of laterally spaced openings which correspond in spacing to the spacing of knock-out openings provided in sides of said electrical box.

5. A support assembly in accordance with claim 1, wherein:
   said central portion of said unitary support plate defines at least one opening through which an associated conduit can extend generally vertically through said support plate.

6. A support assembly in accordance with claim 1, wherein:
   said unitary support plate includes four of said leg portions extending from said central portion, and spaced at right angles to each other,
   said support plate being scored at the junction of each of said leg portions with said central portion to facilitate separation of any selected one or more of said leg portions from said central portion.

7. A support assembly in accordance with claim 1, wherein:
   said unitary support plate includes a pair of said leg portions extending in opposite directions from said central portion,
   said support plate being scored to permit said leg portions to be separated from each other.

* * * * *